US008606572B2

(12) United States Patent
Zhu et al.

(10) Patent No.: US 8,606,572 B2
(45) Date of Patent: Dec. 10, 2013

(54) NOISE CANCELLATION DEVICE FOR COMMUNICATIONS IN HIGH NOISE ENVIRONMENTS

(75) Inventors: Manli Zhu, Pearl River, NY (US); Qi Li, New Providence, NJ (US); Joshua J. Hajicek, Montclair, NJ (US)

(73) Assignee: LI Creative Technologies, Inc., Florham Park, NJ (US)

(*) Notice: Subject to any disclaimer, the term of this patent is extended or adjusted under 35 U.S.C. 154(b) by 559 days.

(21) Appl. No.: 12/924,681

(22) Filed: Oct. 4, 2010

(65) Prior Publication Data

US 2012/0084084 A1 Apr. 5, 2012

(51) Int. Cl.
*G10L 15/20* (2006.01)

(52) U.S. Cl.
USPC .......... 704/233

(58) Field of Classification Search
USPC .......... 704/226, 233; 381/361–367
See application file for complete search history.

(56) References Cited

U.S. PATENT DOCUMENTS

| | | | | |
|---|---|---|---|---|
| 3,723,670 | A * | 3/1973 | Sebesta et al. | 379/430 |
| 4,023,209 | A * | 5/1977 | Frieder et al. | 2/6.6 |
| 4,154,981 | A * | 5/1979 | Dewberry et al. | 379/175 |
| 4,374,301 | A * | 2/1983 | Frieder, Jr. | 379/430 |
| 5,034,747 | A * | 7/1991 | Donahue | 342/20 |
| 5,060,308 | A * | 10/1991 | Bieback | 398/133 |
| 5,136,555 | A * | 8/1992 | Gardos | 367/132 |
| 5,159,641 | A * | 10/1992 | Sopko et al. | 381/367 |
| 5,280,524 | A * | 1/1994 | Norris | 379/388.02 |
| 5,282,253 | A * | 1/1994 | Konomi | 381/151 |
| 5,574,794 | A | 11/1996 | Valley | |
| 5,579,284 | A * | 11/1996 | May | 367/132 |
| 5,586,176 | A * | 12/1996 | Peck | 379/175 |
| 5,889,871 | A * | 3/1999 | Downs, Jr. | 381/173 |
| 5,990,793 | A * | 11/1999 | Bieback | 340/573.1 |
| 2002/0068616 | A1* | 6/2002 | Tabata et al. | 455/568 |
| 2003/0059078 | A1* | 3/2003 | Downs et al. | 381/381 |
| 2003/0068060 | A1* | 4/2003 | Olson | 381/365 |
| 2005/0033571 | A1* | 2/2005 | Huang et al. | 704/231 |
| 2006/0009970 | A1* | 1/2006 | Harton et al. | 704/231 |
| 2006/0286933 | A1* | 12/2006 | Harkins et al. | 455/41.2 |
| 2007/0113964 | A1* | 5/2007 | Crawford et al. | 156/249 |

* cited by examiner

*Primary Examiner* — Jialong He
(74) *Attorney, Agent, or Firm* — Ash Tankha; Lipton, Welsberger & Husick

(57) ABSTRACT

This invention presents a noise cancellation device for improved personal face-to-face and radio communications in high noise environments. The device comprises speech acquisition components, an audio signal processing module, a loudspeaker, and a radio interface. With the noise cancellation device, the signal-to-noise ratio can be improved by as much as 30 dB.

20 Claims, 17 Drawing Sheets

(a) Energy-based Algorithm (b) Change-point Detection Algorithm

Noisy Signal

After Cochlear Transform Based NR

After Wiener Filter Based NR

After Spectral Subtraction NR

NOISE CANCELLATION DEVICE FOR COMMUNICATIONS IN HIGH NOISE ENVIRONMENTS

FIELD OF THE INVENTION

This invention presents a device that can provide a noise cancellation solution for firefighters, first responders, and other persons, who may or may not wear a mask or other Personal Protection Equipment (PPE), in order to improve personal communications in a high-noise environment. The device comprises four modules, speech acquisition module, an Audio Signal Processing (ASP) module, a loudspeaker, and a radio interface. The speech acquisition module can be in the form of a contact microphone, an in-the-ear microphone, or both. The ASP module, which can be implemented by either digital or analog processing, contains a noise reduction unit to improve the signal-to-noise ratio without sacrificing speech intelligibility, a spectra equalization unit to equalize the energy of low- and high-frequency of speech signals, and a Voice Activity Detection (VAD) unit to detect speech. The loudspeaker and radio interface make the device a universal solution for communications with and without radios.

BACKGROUND OF THE INVENTION

People need to wear a mask or other PPE when they work in dangerous areas for the sake of safety. For example, a firefighter must wear a Self-Contained Breathing Apparatus (SCBA) when battling a fire. When a mask or PPE is worn, it becomes difficult to conduct face-to-face or person-to-radio communications because speech is heavily attenuated by the mask or PPE. What is more, any communication can be severely degraded by the background noise. In an extremely noisy environment, the radio can hardly pick up any clean speech at all. The firefighter has to shout loudly in order to be heard accurately. However, it is very important and necessary for people with a mask or PPE to have very clear and effective communications in such a high-noise environment. Poor communication not only decreases the working efficiency but also can be fatal.

So far, various solutions to improve the efficiency of communications have been developed and utilized. Operational procedures, such as hand and arm signals, provide a primitive solution and are not effective for scenarios requiring hands-free communications. Commercial Noise Cancellation Devices (NCDs) that can cancel ambient noise have been developed, although these devices can only work well when communicating without radios or when communicating through radios in a Push-To-Talk (PTT) mode. As a core component of these NCDs, three different kinds of microphones have been employed to improve the efficiencies of communications in the market: in-the-mask microphone, bond-conduct microphone, and adhesive microphone.

The first option, an in-the-mask microphone integrated with the mask, is an expensive solution since the first responder needs to replace the whole SCBA. The SCBA has a potential risk of air leakage because the microphone needs to be wired out for connection to an external radio. In addition, speech becomes distorted as it passes through the SCBA. The second option is the use of a bone-conduct microphone, but such a microphone needs to have a very tight contact with the human body. This contact needs to be either directly on the skull or the throat, which makes the user uncomfortable. The installation is clearly not stable since it cannot be rigidly fixed to the human body. An adhesive microphone attached to the outside of the SCBA is the third option. It cannot be considered a complete solution, however, due to the following reasons: (1) no further active noise reduction technology has been applied. As a result, the noise level is still not low enough for comfortable listening; (2) the speech picked up by the adhesive microphone sounds different from normal speech because the speech is excited within the SCBA, so the person who listens to the speech has difficulty in identifying who is talking; (4) it does not work with those first responders who don't wear a face mask but work in a high-noise environment.

Besides the above drawbacks, no present commercial NCD has adequately addressed the Voice Operates Switch (known as VOX) mode with radios. In VOX communication mode, the radio acts as an open microphone and sends signals out only when speech is detected. With these commercial NCDs, the VOX mode with radios is not robust enough against background noise, which may cause the radio to continuously transmit unwanted noise across the network and interfere with others' abilities to use the same frequency.

To address the above problems, a solution to improve communications is highly desirable. A NCD that supports both face-to-face and person-to-radio communications in highly noisy environments and addresses the above problems is presented with this invention. This device works effectively in high-noise environments through radios in PTT and VOX mode with and without radios.

BRIEF SUMMARY OF THE INVENTION

The invention presents a device that can provide a novel noise cancellation solution for first responders, especially firefighters, to effectively communicate in a high-noise environment regardless of the communication mode. The device is compatible with the first responders' existing equipment and has no impact on the first responders' abilities to perform operational tasks. System requirements of the NCD such as size, weight, and placement of the NCD components are also compatible with the existing firefighter Standard Operating Procedures (SOPs). The NCD is easy to use and affordable by most of fire departments. Maintenance fees and repair costs are low. The NCD has low power consumption to ensure sufficient operation time.

The NCD comprises speech acquisition module, an ASP module, a loudspeaker, and a radio interface.

The speech acquisition module picks up the voice from the person who wears the PPE or mask and can be in the form of a contact microphone, an in-the-ear microphone, or both. The contact microphone is installed on the outside surface of the mask and has an integrated piezoelectric transducer to detect the voice vibration from the mask. Since contact microphone picks up the reverberation signals from the mask when a person is speaking. The device can get rid of background noise and only pick up speech signals because the background noise in the open space cannot generate the same reverberation as the speech within the mask. The contact microphone is washable and disposable after being used in a polluted environment. The in-the-ear-microphone is inserted in the ear of the person who may or may not wear a mask or PPE and can pick up speech signals from the Cochlear emissions. Since the ear plug of the in-the-ear microphone can block background noise, this microphone can improve the signal-to-noise ratio significantly. The in-the-ear microphone has a replaceable earplug that varies in sizes to fit on each individual's hear canal. Unlike the contact microphone, the in-the-ear microphone can be used for communications with or without a mask because its mounting does not rely on any mask or PPE.

The purpose of the ASP module is to convert noisy speech to clean speech. The function of the ASP module can be implemented by either an analog or a digital processing. The ASP module itself includes an adaptive noise reduction unit to clean the noisy speech, a spectral equalization unit to correct the spectra distortion introduced by face mask, and a VAD unit to detect speech for the VOX function. The speech signals acquired from the above microphones can have distortion and noise, and therefore further signal processing is needed to improve the speech quality through the spectra equalization and noise reduction units.

The loudspeaker supports face-to-face communications, which are necessary since people cannot hear each other clearly when they wear masks or PPEs. The radio interface supports person-to-radio communications by enabling the device to output clean speech signals to a radio device.

BRIEF DESCRIPTION OF THE DRAWINGS

The invention can be more fully understood by reading the subsequent detailed descriptions and examples with references made to the accompanying drawings, wherein.

DETAILED DESCRIPTION OF THE INVENTION

Figure 1:
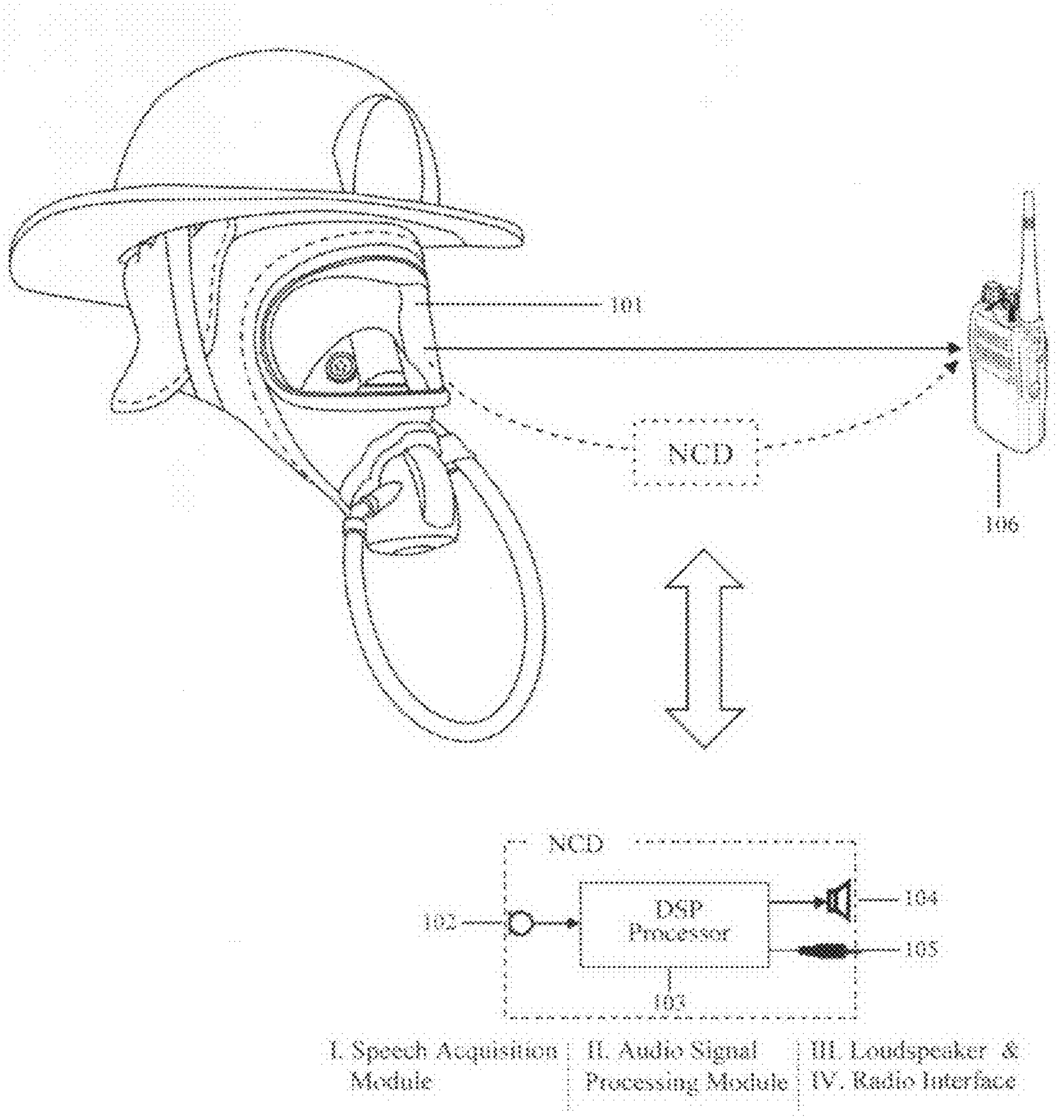
FIG. 1 shows the layout of the NCD.

FIG. 1 shows the layout of the NCD. As shown in FIG. 1, the NCD establishes a connection between the person who wears a mask 101 and a radio 106 for good communications. The NCD has four modules: speech acquisition module 102, an ASP module 103, a loudspeaker 104, and a radio interface 105. One embodiment of the radio interface 105 can be an audio jack, so the radio 106 can be connected by a piece of cable with the audio jack. The speech acquisition module is used to capture speech from persons who may or may not wear a PPE or mask. The ASP module processes the detected noisy voice and delivers clean speech to the loudspeaker 104 for face-to-face communications and to the radio interface 105 for wireless radio communications.

Figure 2:
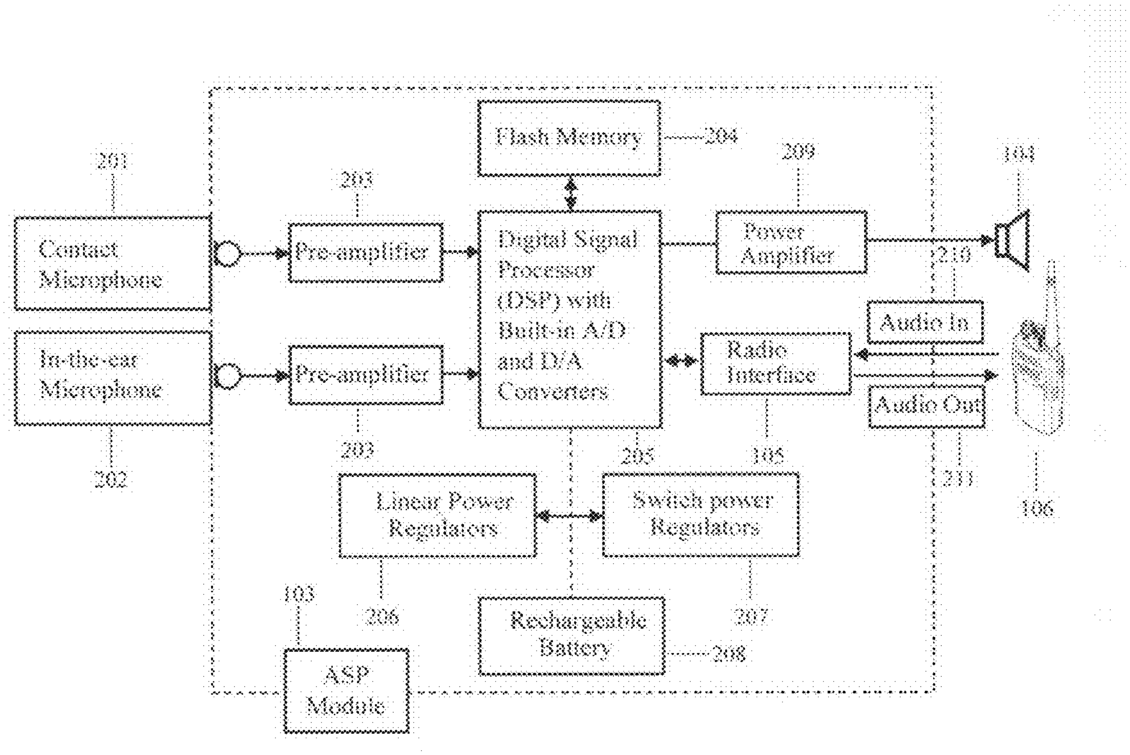
FIG. 2 shows the hardware structure of the NCD with digital implementation.

FIG. 2 illustrates the hardware structure of the NCD with a digital signal processor. Speech acquisition module 102, as described in FIG. 1, have three formats: contact microphone 201, in-the-ear microphone 202, or the combined contact and in-the-ear microphones. The contact microphone is attached to the outside surface of the mask, while the in-the-ear microphone is inserted in the speaker's ear. A contact microphone can convert mechanical vibrations to electric signals. It has an embedded piezoelectricity transducer that can pick up the vibration. The vibration is soon converted into a voltage that can then be made audible. A firefighter normally wears a SCBA in an emergency situation, and therefore his or her face is tightly covered by the face mask. When the firefighter starts to speak, the voice generates positive pressure inside the mask, which leads to vibrations on the rigid surface of the mask. The vibrations can be picked up by the contact microphone. Because the noise in the open environment has few contributions to the surface vibration, the contact microphone can pick up the clean wearer's voice with little influence from background noise. The in-the-ear microphone is another microphone that can be used in this invention. When a person speaks, his or her voice is transmitted within his or her body and can be detected in the ear from Cochlear emissions. This way the in-the-ear microphone can pick up the speech signals from the Cochlear emissions. The dimensions of an in-the-ear microphone can be small. A preferred diameter of an in-the-ear microphone is less than 3 mm and a preferred length is less than 5 mm. The in-the-ear microphone can be built into an ear plug, which has an ear hood for easy and stable wearing. Both microscopes can pick up human speech in a different way from that of a traditional microphone such that background noise is significantly blocked.

The ASP module 103 with digital implementation includes four major chips, namely, two pre-amplifiers 203 for microphones 201 and 202, a flash memory 204, a DSP 205 with built-in Analog-to Digital (A/D) and Digital-to-Analog (D/A) converters, and a power amplifier 209 for the speaker 104. The output analog signals from the microphone 201 and microphone 202 are amplified and then imported into the DSP 205. The flash memory 204 stores the software for the DSP chip 205. Once the device starts to operate, the DSP chip 205 can read the software from the flash memory 204 into internal memory and begins to execute the codes. During the initiation processes, the software is written into the registers of the DSP chip 205. Two power regulators are used: one is the linear power regulator 206 and the other is switch power regulator 207. The regulators are used to provide stable voltage and current supply for all the components on the circuit board. A battery or rechargeable battery 208 provides the power supply for the NCD. The loudspeaker 104 is used for face-to-face communications and the radio interface 105 connects the NCD with the radio 106 for wireless communications.

The communications between the firefighters and the radio are two-way communications through the audio in 210 and audio out 211. As shown in FIG. 2, to maintain clear and effective communications, the analog signals from the radio 106 can be sent to the DSP 205 and released to the speaker 104 after being processed via the audio in 209.

The NCD works as follows: after acoustic analog signals are picked up by the microphone or microphones, which can be the contact microphone, in-the-ear microphone or both, these signals are amplified by the amplifiers 203. The analog signals are then converted to a digital form by using an A/D converter. This way the analog signals are turned into a stream of numbers. However, the required output signals have to be analog signals, which require a D/A converter. The A/D and D/A converters can only change the signal format. The DSP chip 205 implements all the signal processing. As mentioned before, the ASP module includes an adaptive noise reduction unit to clean the noisy speech, a spectral equalization unit to correct the spectra distortion introduced by the face mask, and a noise-robust VAD unit to detect speech for VOX function.

Figure 3:
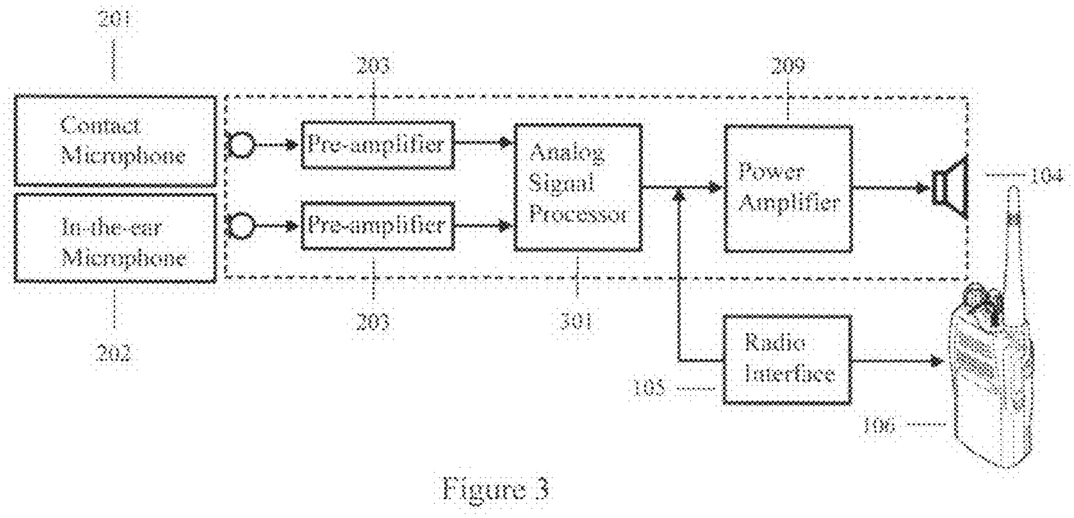
FIG. 3 shows the NCD with analog implementation.

FIG. 3 shows the NCD with analog implementation. The dashed block in FIG. 3 is similar to the ASP module with digital implementation in FIG. 2. An analog signal processor 301 is introduced to process the audio signals picked up by the contact microphone 201 and/or the in-the-microphone 202.

Figure 4:
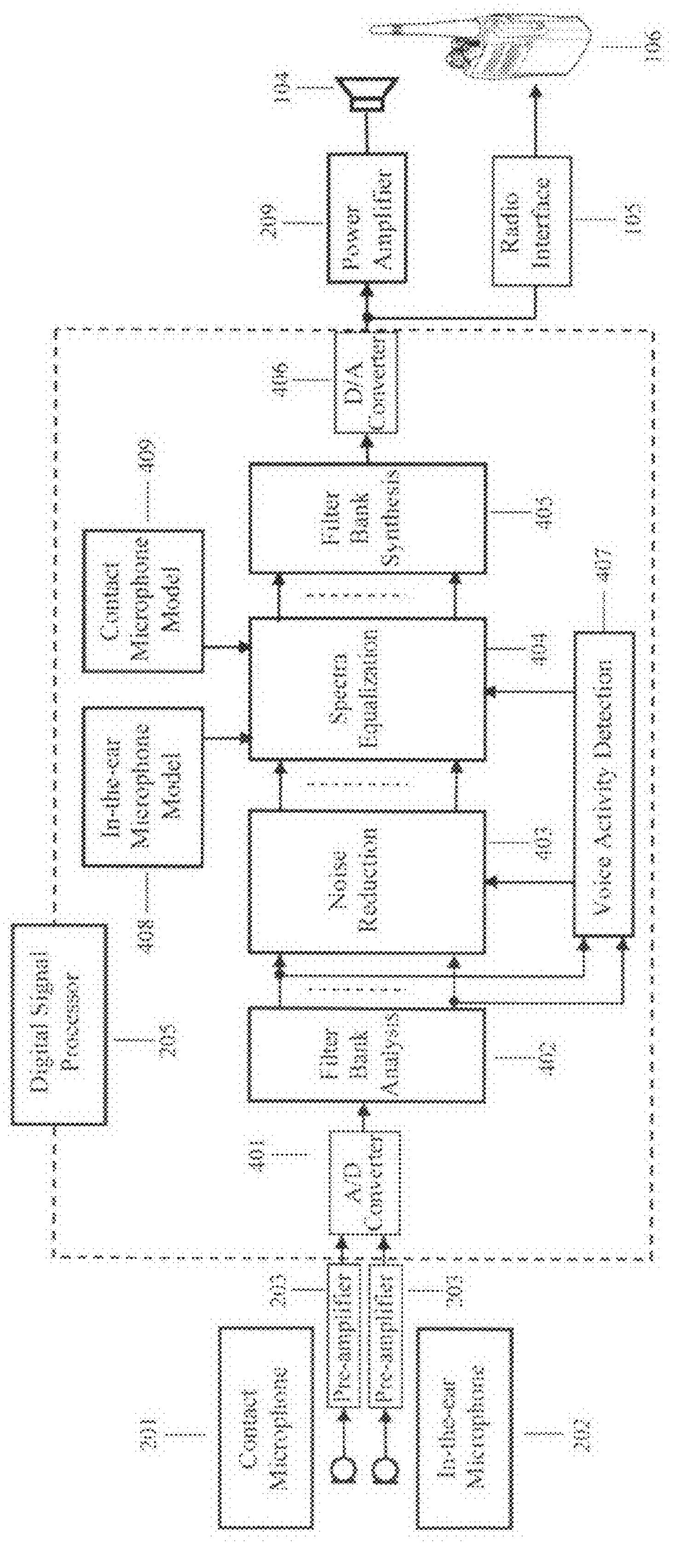
FIG. 4 shows a detailed system diagram with digital implementation.

FIG. 4 is a detailed system diagram of the NCD with digital implementation. The signal processing module starts with a filter bank analysis unit 402, which decomposes the single-channel full-band signals into a number of narrow multiple-channel sub-band signals. In each sub-band, noise reduction algorithms are used to suppress noise and enhance speech, which is achieved by noise reduction unit 403. Four noise reduction algorithms can be applied in this invention and will be explained later.

Either the contact microphone or in-the-ear microphone picks up the speaker's voice on the mask or in the ear, so the spectrum of the signals is different from the spectrum of the signals transmitted in the open air. The low frequency information is boosted such that the signals sound like talking with a mask covering the mouth. A spectra equalization unit 404 equalizes the energy in low and high frequency bands. After equalization, the signals are more evenly distributed over the full bands and speech intelligibility is improved. After the signals in all sub-bands are processed, a filter bank synthesis unit 405 can combine multi-channel sub-band signals together into a single channel full-band speech signals. A VAD unit 407 can tell where the speech is. Both the noise reduction unit 403 and spectra equalization unit 404 can use the information from the VAD unit 407 to update noise statistics and suppress noise in noise section and keep speech intact in speech section. An A/D converter 401 and a D/A converter 406 switch between digital and analog signals. An in-the-ear microphone model 408 and a contact microphone model 409 are built in the invention: the in-the-ear microphone model 408 simulates the difference between a close-talk microphone and an in-the-ear microphone, while the contact microphone model 409 simulates the difference between a close-talk microphone and a contact microphone. These two models can correct the spectra distortion such that the signals after the models sound more natural than before the models. Only one model will be applied if only one type of microphones is used to pick up the audio signals in the NCD.

Figure 5:
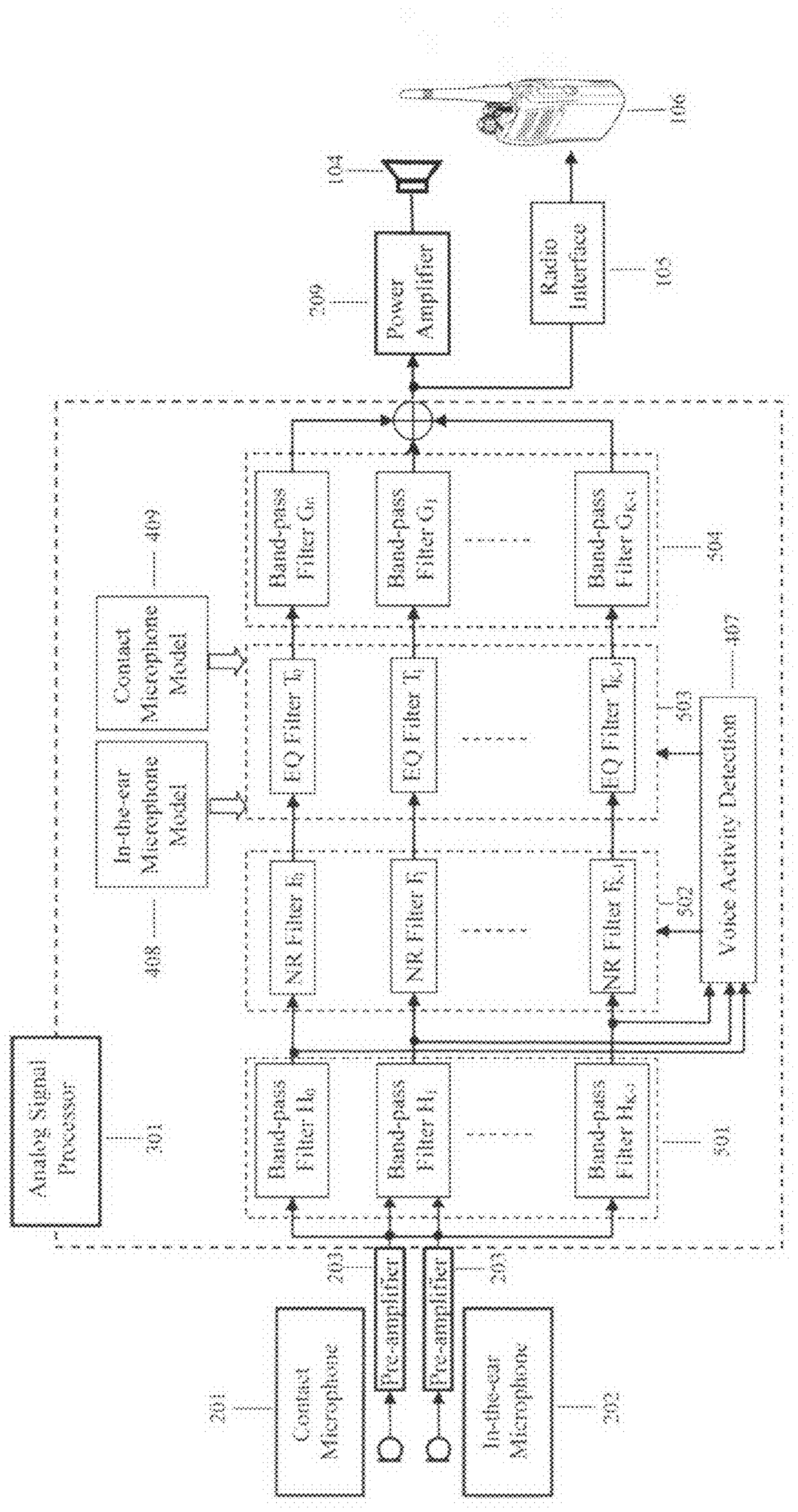
FIG. 5 shows a detailed system diagram with analog implementation.

FIG. 5 is a detailed system diagram of the NCD with analog implementation. The difference between digital and analog implementation is that analog filters are used to block the noise with some certain frequencies. The analog signal processor 301 comprises a set of band-pass filters 501, a set of noise reduction (NR) filters 502, a set of spectra equalization filters 503, and a set of band-pass filters 504. It is assumed that k is the total number of sample points, so the number of sub-bands is k−1. The band-pass filters 501 from $H_0$ to $H_{k-1}$ have the same functions as the filter bank analysis unit 402 in FIG. 4, the noise reduction filters from $F_0$ to $F_{k-1}$ 502 have the same functions as the noise reduction unit 403, the equalization (EQ) filters $T_0$ to $T_{k-1}$ 503 have the same functions as the spectra equalization unit 404 in FIG. 4, and the band-pass filter $G_0$ to $G_{k-1}$ 504 have the same functions as the filter bank synthesis unit 405. The VAD unit 407, in-the-ear microphone model 408, and contact microphone model 409 have the exact same functions as described in FIG. 4.

Figure 6:
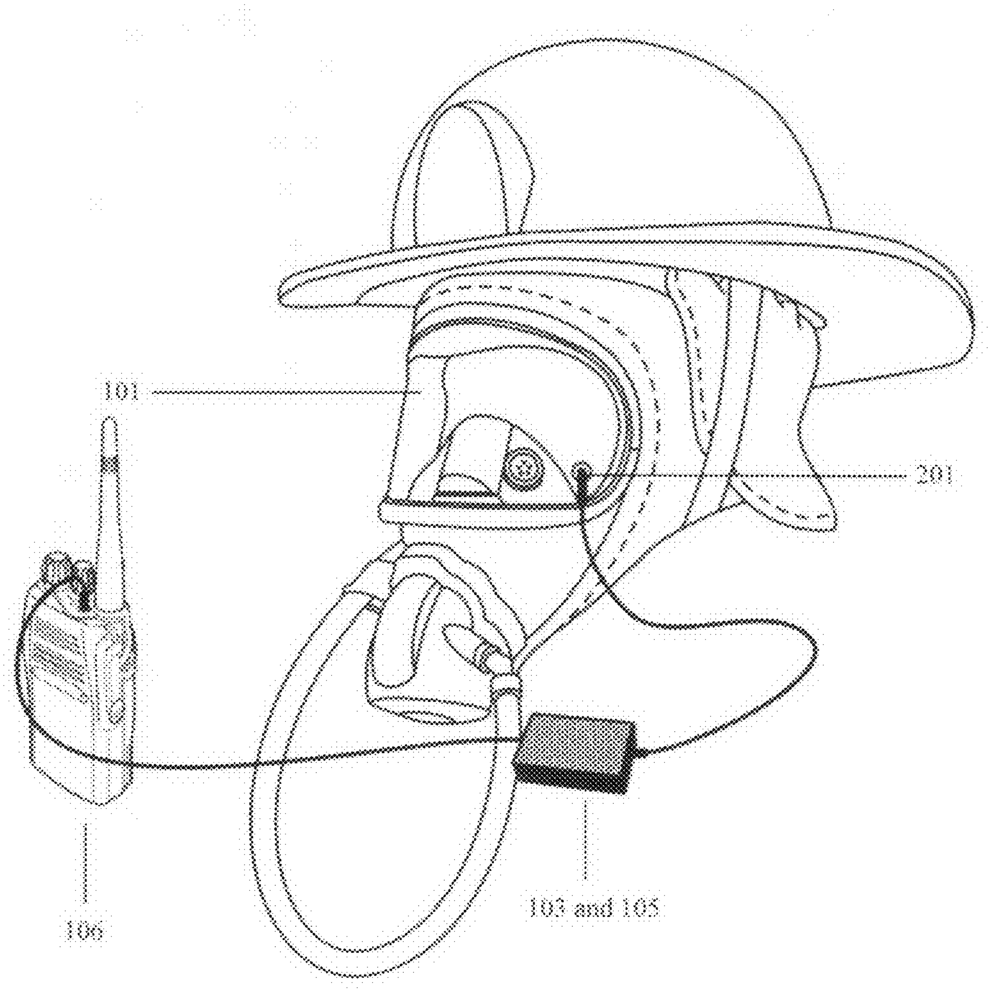
FIG. 6 shows one embodiment of the NCD with a contact microphone.

FIG. 6 is one embodiment of the NCD with the contact microphone 201, where the contact microphone is attached the outside surface of the mask 101. The ASP 103 module and the radio interface module 105 are combined for people who wear a mask to communicate through the radio 106.

Figure 7:
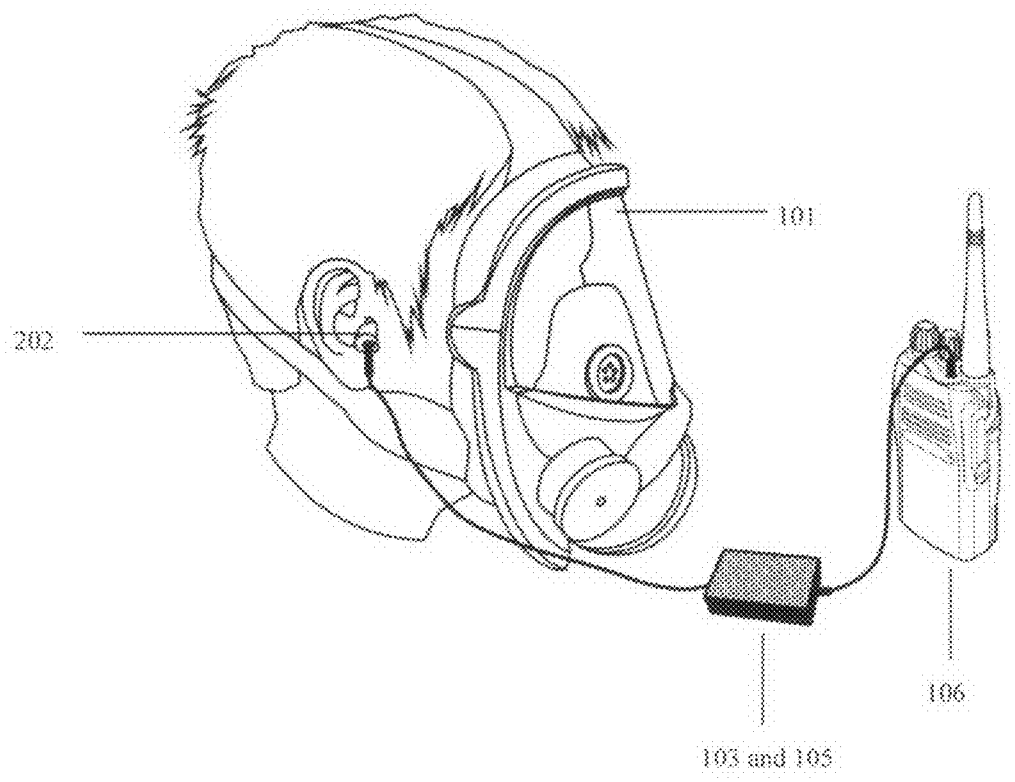
FIG. 7 shows one embodiment of the NCD with an in-the-ear microphone.

FIG. 7 is one embodiment of the NCD with the in-the-ear microphone 202. The in-the-ear microphone is inserted in the human ear, so the installation does not depend on the mask 101. The in-the-ear microphone can be used for communications without a mask or PPE. The ASP module 103 and the radio interface 105 are combined for people who wear the mask 101 to communicate through the radio 106.

Figure 8:
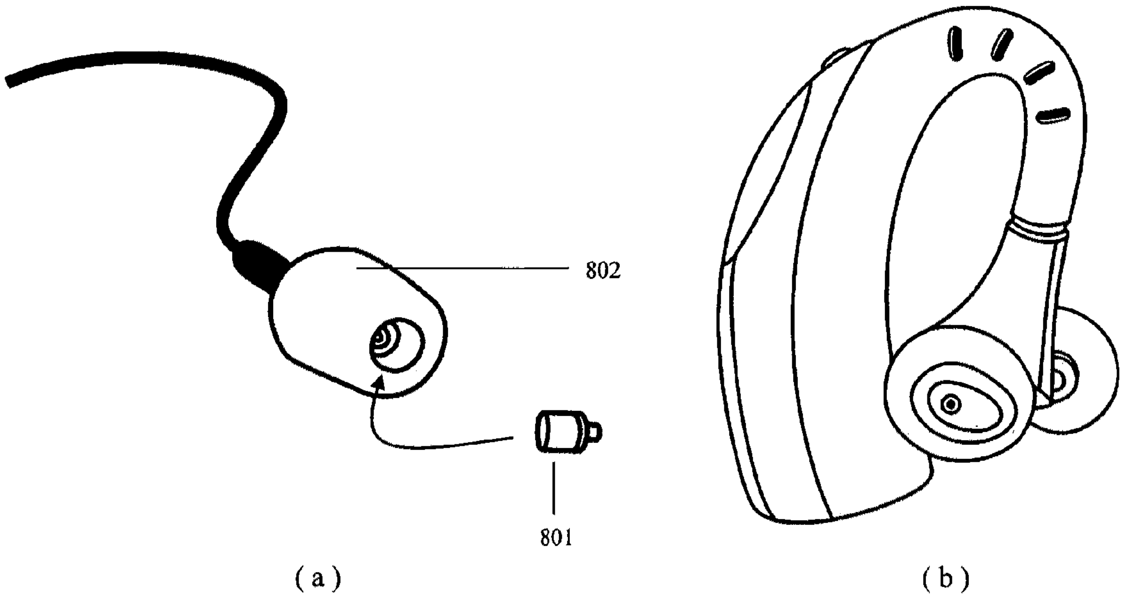
FIG. 8 shows the structure of the in-the-ear microphone.

FIG. 8 shows the detailed structure of the in-the-ear microphone 802. The component in the circle is a mini microphone 801. It can be built into an ear plug as shown in FIG. 8(*a*). The final design of the in-the-ear microphone device can be similar to what is shown in FIG. 8 (*b*), which has an ear hood for easy and stable wearing.

The noise reduction algorithms that can be applied in either noise reduction unit 403 or the set of noise reduction (NR) filters 502 include Wiener filter based noise reduction, spectral subtraction noise reduction, Cochlear transform based noise reduction, and model-based noise reduction algorithm.

Figure 9:
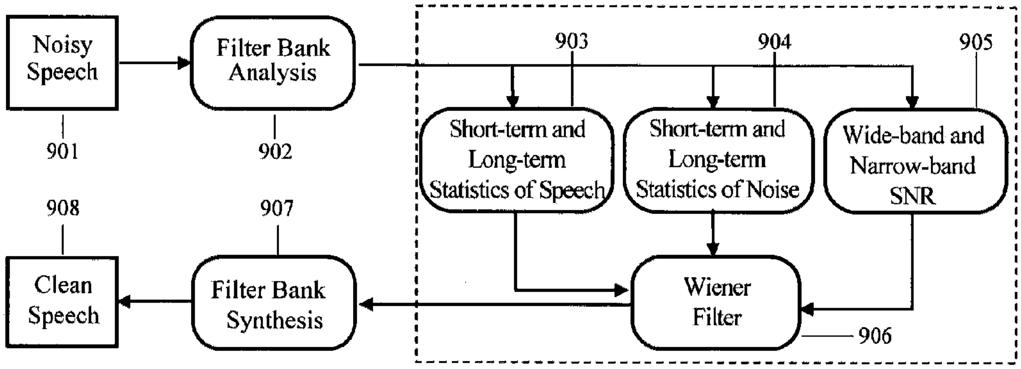
FIG. 9 shows the adaptive noise-reduction algorithm based on the temporal Wiener filter.

The schematic diagram of the Wiener filter based noise reduction is shown in FIG. 9. It consists of three key components: a filter bank analysis unit 902, adaptive Wiener filtering 906, and a filter bank synthesis unit 907. The filter bank analysis unit 902 transforms the full-band noisy speech sequence into the frequency domain such that the subsequent analysis can be performed on a sub-band basis. This is achieved by the short-time discrete Fourier transform (DFT). The bandwidth of each sub-band is given by the ratio of the sampling frequency to the transformed length. The NCD explores the short-term and long-term statistics of speech 903 and noise 904, and the wide-band and narrow-band signal-to-noise ratio (SNR) 905 to support a Wiener gain filtering. After the spectrum of noisy-speech 901 passes through the Wiener filter, an estimation of the clean-speech spectrum is generated, so it can be said that adaptive Wiener filter 906 estimates the clean-speech spectrum from the spectrum of the noisy speech 901. The filter bank synthesis unit 907, as an inverse process of filter bank analysis unit 902, reconstructs the signals of the clean speech 908 given the estimated spectrum of the clean speech.

Spectral Subtraction (SS) noise reduction algorithm is designed to reduce the degrading effects of noise acoustically added in speech signals. Similar to Wiener filter noised reduction algorithm, SS noise reduction algorithm estimates the magnitude of the frequency spectrum of the underlying clean speech by subtracting frequency spectrum magnitude of the noise from the frequency spectrum magnitude of the noisy speech. The SS algorithm estimates the current spectrum magnitude of the noisy speech by using the average measured noise magnitude when there is no speech activity. Therefore the implemented VAD can help make the VOX function more reliable in a noisy environment, since VAD can determine whether or not someone is speaking. In the first twenty-five milliseconds, it is assumed that only noise appears and the frequency spectrum of the background noise is then estimated. During the noisy speech, the noise spectrum is continuously updated when the current spectrum is below a preset threshold.

In spectra subtraction algorithm, the difference between real noise and estimated noise is called noise residual. Environmental noise sounds like the sum of tone generators with random frequencies. This phenomenon is known as "music noise". To solve this problem, smooth factors are applied in both frequency and time domains to remove the "music noise". The Wiener filter algorithm can be first applied, and then spectral subtraction algorithm is subsequently adopted. After Wiener filtering, the noise level is reduced. The noise residual after spectral subtraction algorithm is low enough to be masked by speech. Therefore, music noise is barely audible in the time domain.

In addition to environmental noise, there are some other different noises generated by the SCBA equipment, such as air-regulator inhalation noise, low-pressure alarm noise, and Personal Alert Safety System (PASS) noise, which all degrade the speech quality. The air-regulator inhalation noise does not directly corrupt speech since people do not normally speak when inhaling. However, the noise can interfere with communications using VOX mode with radio and is detracting to listeners. For those noises with known spectral patterns, the spectra model can be constructed to detect these noises. Once the noise is detected, a technique can be applied to cancel noise with the known spectral patterns. This method is known as model-based noise reduction algorithm.

Figure 10:
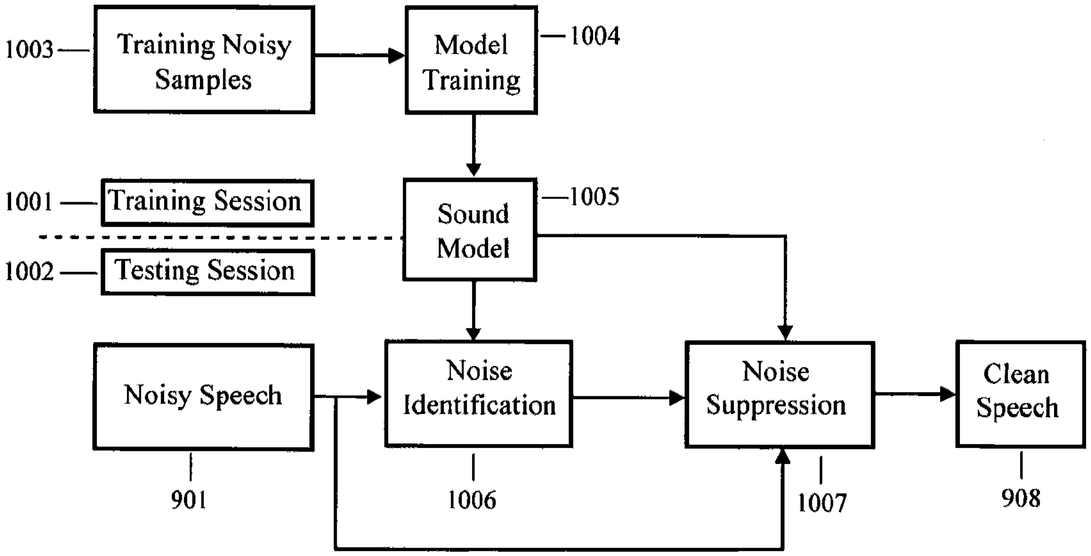
FIG. 10 shows model-based noise reduction algorithm.
Figure 11:
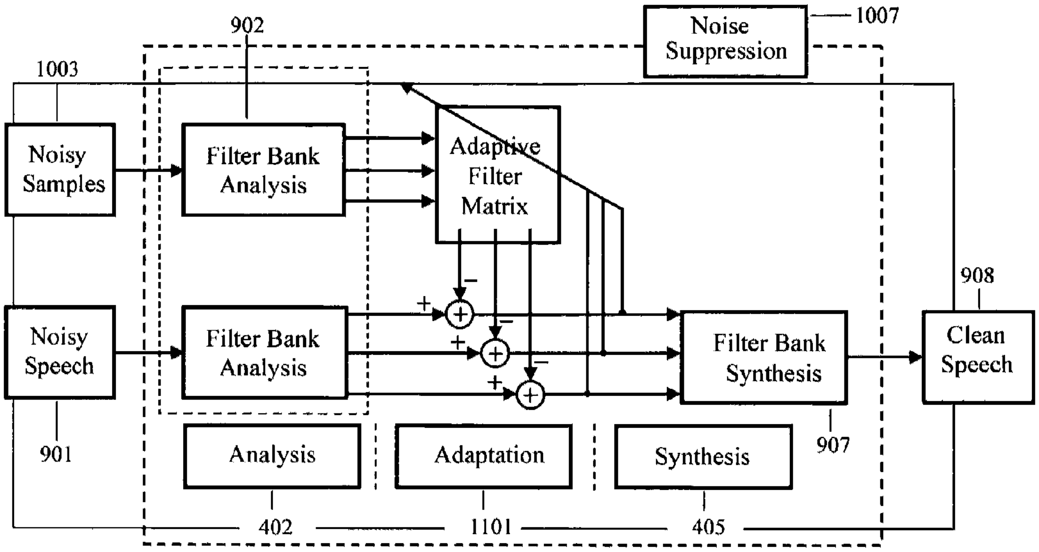
FIG. 11 shows the noise suppression system used in FIG. 10.

The structure of model-based noise cancellation is shown in FIG. 10. It has two sessions: training session 1001 and testing session 1002. In the training session, all known noise samples are first recorded and saved in a training database 1003. In model training, a Gaussian mixture model or a hidden Markov model is trained, which is named as model training 1004, to represent the statistical characteristics of speech sound. For every different kind of sound, a sound model 1005 is trained and saved in a database. During a testing session where sound signals are detected, a noise identification module 1006 is used to decode and compute the likelihood scores of the sound with a group of pre-trained sound models. Therefore every model has an associated score. The model with the largest score is recognized as noise sound model. Once the noise sound is identified by the noise identification 1006, it can be cancelled from the noisy speech 901 using the sub-band noise suppression system 1007 process that is developed as shown in FIG. 11 to get a clean speech 908. Compared to the full-band method, the sub-band implementation causes less speech distortion.

FIG. 11 shows the noise suppression system 1007 used in FIG. 10. Noisy samples 1003, noisy speech 901, filter bank analysis unit 402, filter bank synthesis unit 405, and clean speech 908 have the same functions as discussed before. The adaptive filters matrix 1101 is used to estimate the noise in noisy speech.

The fourth noise reduction algorithm uses a novel developed broadband noise reduction algorithm that takes advantage of the structural correlations in speech signals as opposed to the broad frequency spread of noise signals. Cochlear transform is utilized to decompose noisy speech signals into aurally meaningful band-limited signals. This noise suppression method adaptively works on every of these sub-band signals. The re-synthesized signal output by the noise suppression algorithm is a cleaner version of the noisy speech signals with minimal speech distortion. The Cochlear transform based noise reduction algorithm has been described in detail in the U.S. patent application filed with an application number of Ser. No. 11/374,511. The diagrams of the Cochlear transform embodiments and its working principles are shown in FIGS. 8, 9 and 10 of this patent application filed by the same assignee in this application.

The noise-robust speech acquisition module and novel noise reduction algorithms can guarantee speech intelligibility even in a high-noise environment. In order to support the VOX function and make sure the radio channel is occupied only when speech exists, two VAD algorithms have been developed in this invention.

Figure 12:
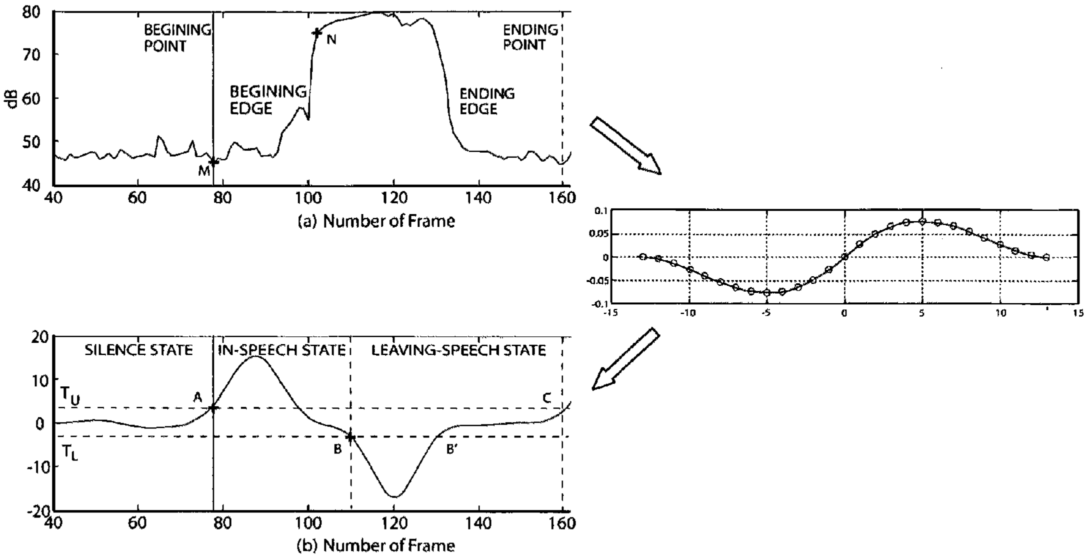
FIG. 12 shows the change-point detection algorithm.

FIG. 12 shows the change-point detection algorithm. In this algorithm, the signal energy is calculated at the beginning. The speech section corresponds to an increased energy as shown in FIG. 12(*a*). An optimal filter, as shown on the right side of FIG. 12, is applied on the signal energy. When the filter approaches an increasing energy, it generates the peak; when it approaches a decreasing energy, it generates the valley as shown in FIG. 12(*b*). Two thresholds $T_U$ and $T_L$ set the upper and lower limits. Status with energy higher than $T_U$ together with a peak is referred to as in-speech state. Status with energy lower than $T_L$ together with a valley is referred to as leaving-speech state. The energy between $T_U$ and $T_L$ is called as silence state. The signals are separated into three states: silence state, in-speech state, and leaving-speech state. Speech starts at the beginning of in-speech state and speech ends at the end of the leaving-speech state.

Figure 13:
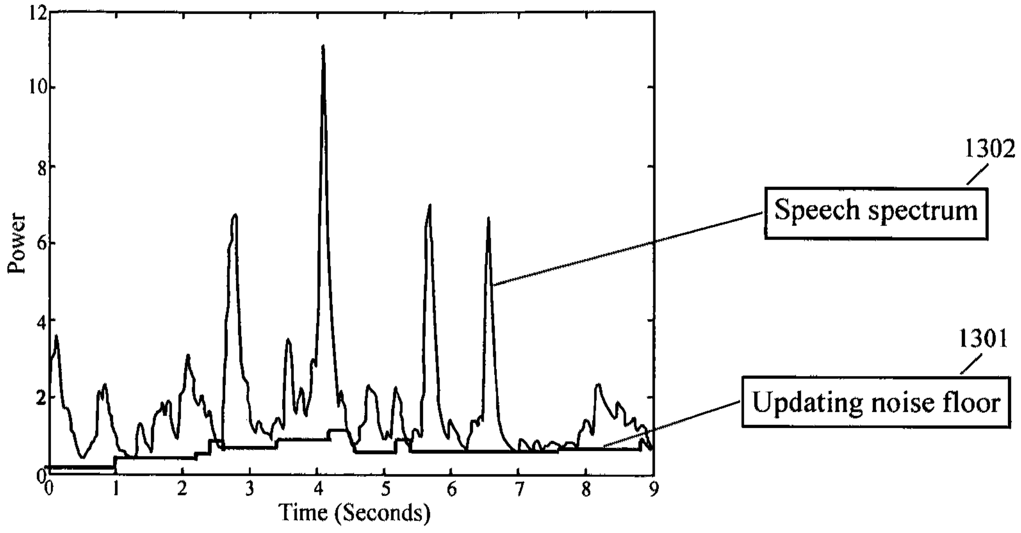
FIG. 13 shows short time sub-band power with an estimated noise floor of noisy speech signals where the frequency is 8000 Hz, the number of sub-bands is equal to 8, and the window size is 256.

FIG. 13 shows short time sub-band power with an estimated noise floor of noisy speech signals where the frequency is 8000 Hz, the number of sub-bands is equal to 8, and the window size is 256. FIG. 13 explains the principle of the energy-based method. In the energy-based method, the difference between the energy Y of the signals and the energy N of the noise is calculated and defined as DIST as described in Equation 1. When the difference is greater than a threshold δ, it is labeled Speech as described in Equation 2 and when the difference is less than the threshold δ, it is labeled Silence as described in Equation 3.

$$DIST = Y - N \quad \text{Equation 1}$$

$$DIST = \begin{cases} \text{Speech} & DIST > \delta \quad \text{Equation 2} \\ \text{Silence} & DIST < \delta \quad \text{Equation 3} \end{cases}$$

The key issue of the energy-based method is how to estimate the noise power accurately. If a wrong threshold δ is used, the difference DIST cannot tell where the speech is. In the invention, the minimum power of the sub-band noise within a finite window is used to estimate the noise floor. The algorithm is based on the observation that a short time sub-band power estimate of noisy speech signals exhibits distinct peaks and valleys, as shown in FIG. 13. While the peaks correspond to speech activity, the valleys of the smoothed noise estimate can be used to obtain an estimate of sub-band noise power. To obtain reliable noise power estimates, the window size is selected in such a way that it is large enough to bridge any peak of speech activity. In FIG. 13, updating noise floor 1301 is plotted with a dark line and speech spectrum 1302 is plotted with a gray line. Updating noise floor is found in the FIG. 13.

Figure 14:
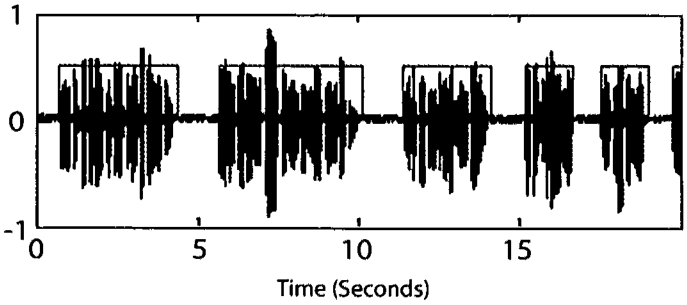
FIG. 14 shows the results applied with the VAD.
Figure 14:
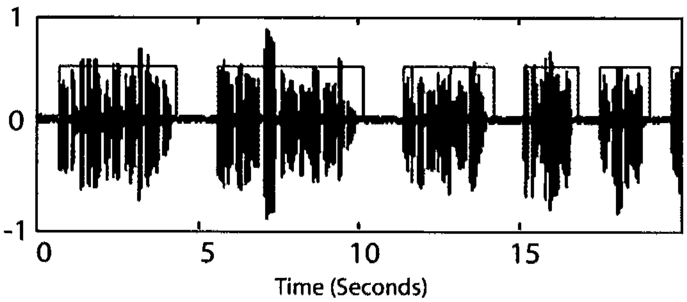

As described above, the VAD unit has two algorithms. One is the energy-based method and the other is the change-point detection algorithm. FIGS. 14(*a*) and (*b*) show the results after the energy-based algorithm and change-point detection algorithm of the VAD have been applied. The dark line indicates speech signals including speech sections and silence sections. The gray line presents the results after the VAD which indicates where the speech is. Each method can accurately identify the location of the speech section.

Figure 15:
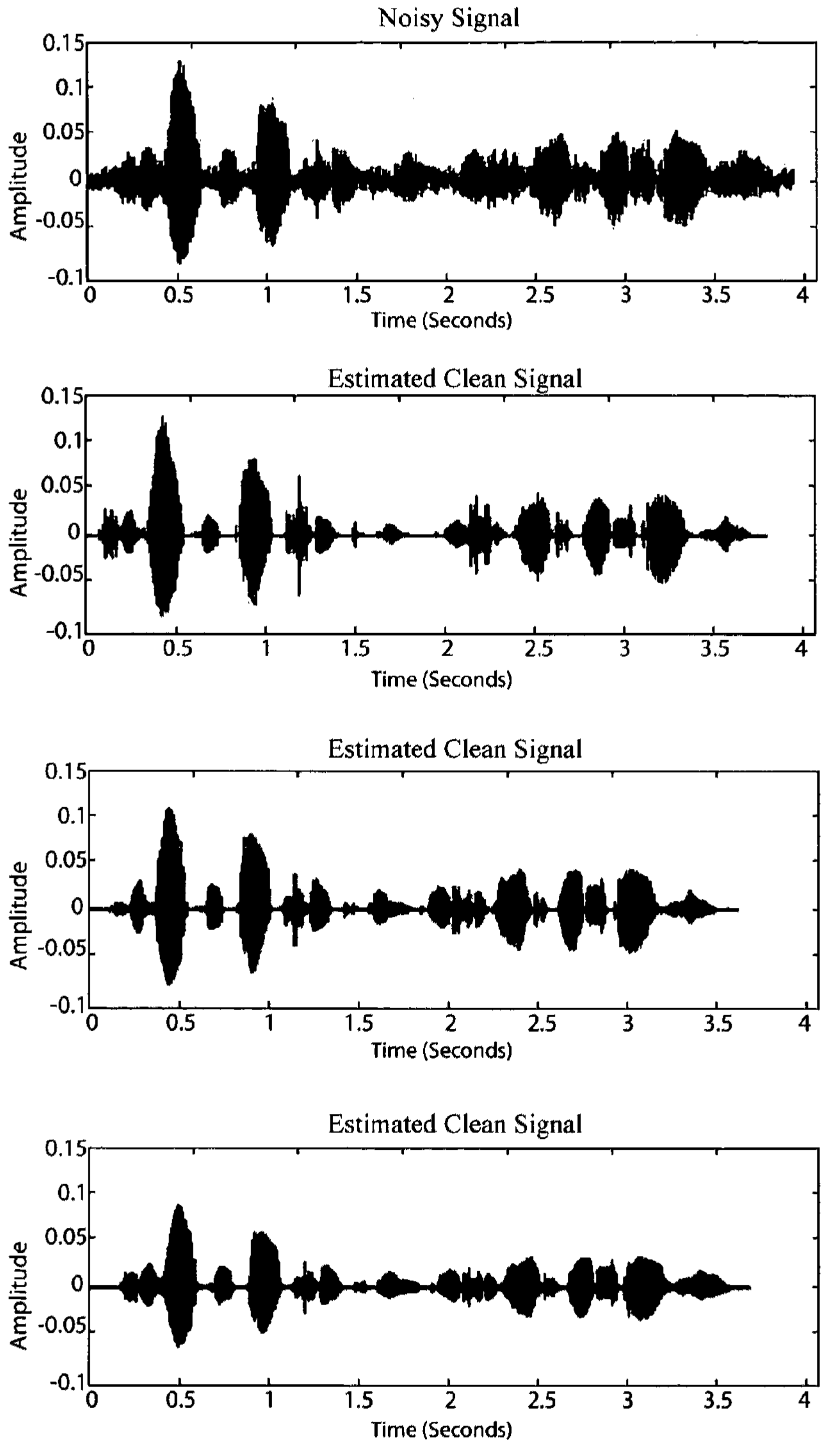
FIG. 15 shows improved audio signals with three noise reduction algorithms applied.
Figure 16:
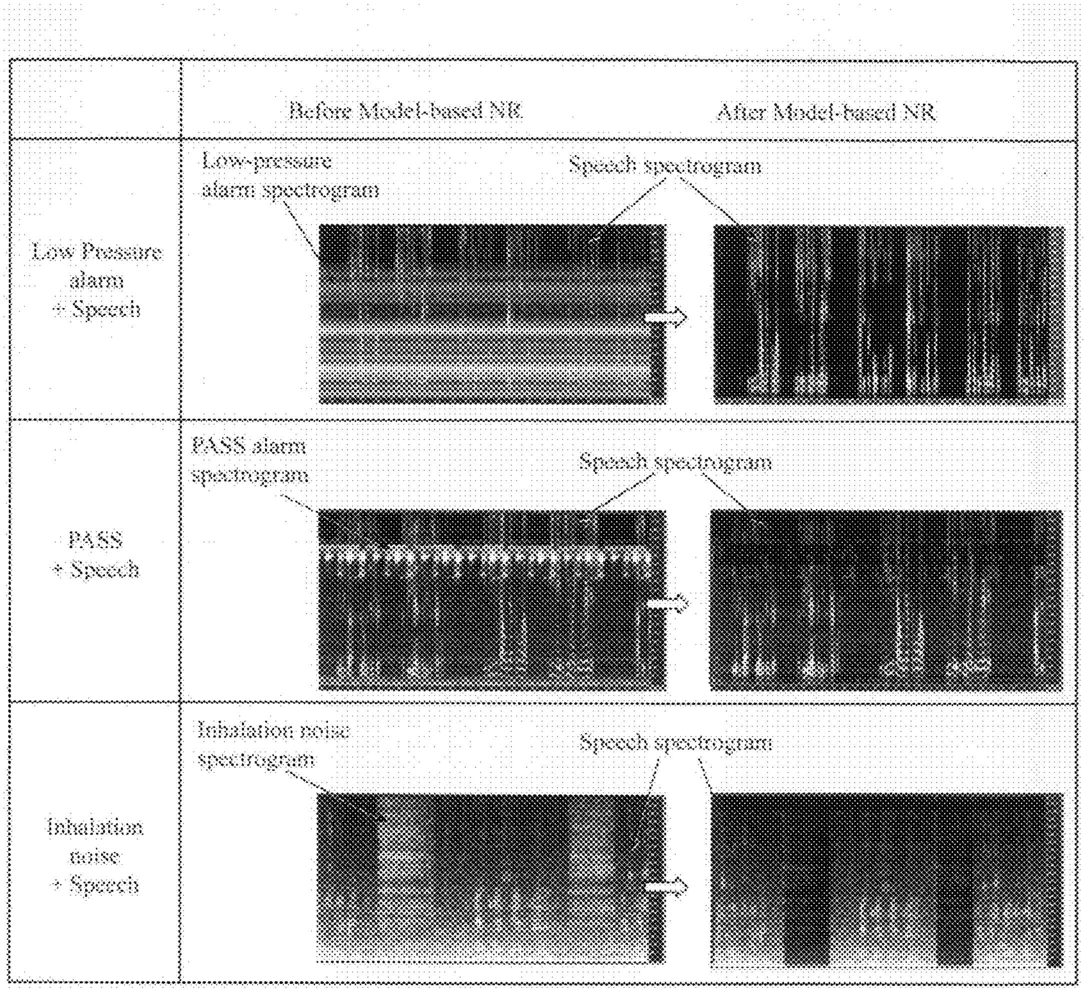
FIG. 16 shows improved audio signals with model-based noise reduction algorithm.
Figure 17:
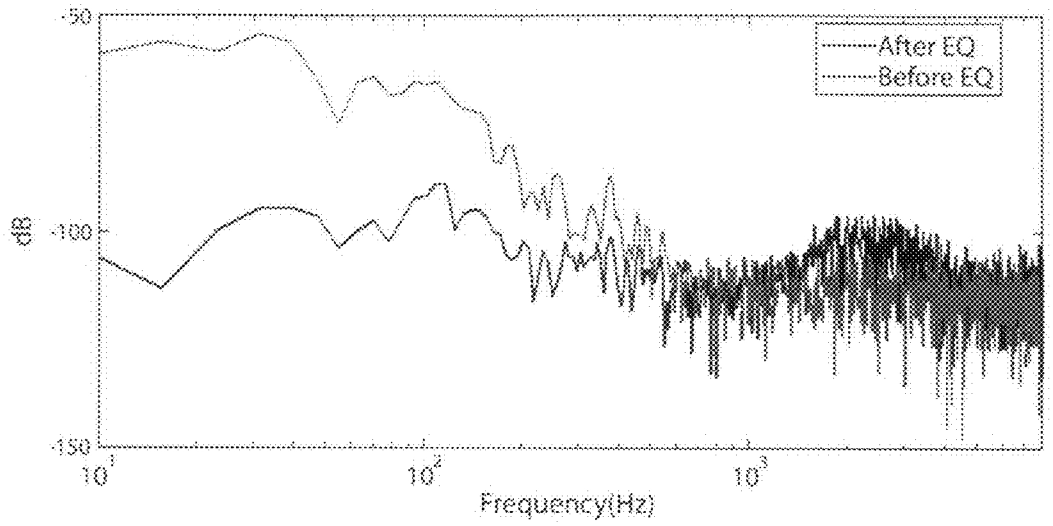
FIG. 17 shows results by spectral equalization for the NCD with the in-the-ear microphone.

FIGS. 15, 16 and 17 show improved results with the developed NCD. FIG. 15 shows the speech signals when three noise reduction algorithms are applied. The noise reduction algorithms applied are Cochlear transform based noise reduction, Wiener filter based noise reduction, and spectral subtraction noise reduction algorithms. The x-axis is the time in seconds and the y axis is the signal magnitude. After the algorithms are applied, the signal-to-noise ratio improvement is about 10-15 dB.

FIG. 16 shows improved audio signals with model-based noise reduction algorithm. The left column presents the noisy signals before model-based noise reduction and the right column describes the signals after model-based noise reduction. It is clear that low-pressure-alarm noise, PASS noise, and inhalation noise are significantly suppressed while the speech spectrum is intact. For low-pressure alarm and PASS noise, although they may degrade the radio communication quality, the commander needs to hear it through the radio for the sake of safety. Therefore, in this invention, the noise suppression level has to be controlled in such a way that both requirements can be met.

FIG. 17 shows the improved results by the spectra equalization. The horizontal axis is frequency range and the vertical axis is energy level. The gray line shows the signals before the spectra equalization and the dark line shows the signals after spectra equalization. As shown, the signals are more evenly distributed after spectra equalization.

In the foregoing description, the present invention can be implemented in a variety of embodiments, namely with one or two different microphones, in analog or digital signal processing module, with loudspeaker or radio, and with one or a combination of noise reduction algorithms. These embodiments will be apparent to any skilled practitioner in the art.

What is claimed is:

1. A noise cancellation device for personal face-to-face and radio communications in a high noise environment, comprising:

- a speech acquisition module for audio signal collection, comprising:
  - a contact microphone mounted on a rigid outer surface of one of a mask of a wearer and a personal protection equipment of said wearer, said microphone configured for picking up voice vibrations from said rigid outer surface of said mask and said personal protection equipment; and
  - an in-the-ear microphone for picking up signals from cochlear emissions in an ear canal of said wearer;
- an audio signal processing module for processing said voice vibrations and said signals picked up from said cochlear emissions, using a set of noise reduction algorithms, to remove background noise, air-regulator inhalation noise, low-pressure alarm noise, and personal alert safety system noise;
- a loudspeaker with a power amplifier; and
- a radio interface for person-to-radio wireless communication in said high noise environment.

2. The noise cancellation device according to claim 1, wherein said voice vibrations are mechanical vibrations excited by human speech within said mask and said personal protection equipment of said wearer, and wherein said contact microphone mounted on said rigid outer surface of one of said mask and said personal protection equipment of said wearer comprises an integrated piezoelectric transducer configured to transform said mechanical vibrations within one of said mask and said personal protection equipment of said wearer into electrical analog signals.

3. The noise cancellation device according to claim 1, wherein said in-the-ear microphone comprises:

- a mini microphone built into an ear plug configured to pick up speech signals in said ear canal of said wearer wearing said in-the-ear microphone;
- said ear plug configured to fit one of a plurality of sizes of ear canals, said ear plug configured to block outside noise signals from reaching said mini microphone; and
- an ear hood for stable installation of said in-the-ear microphone.

4. The noise cancellation device according to claim 1, wherein said audio signal processing module is a digital signal processing module.

5. The noise cancellation device according to claim 4, wherein the audio signal processing module further comprises:

- a pre-amplifier for said contact microphone;
- a pre-amplifier for said in-the-ear microphone;
- an analog-to-digital (A/D) converter;
- a flash memory to store software;
- a linear power regulator;
- a switch power regulator;
- a battery;
- a digital-to-analog (D/A) converter; and
- a digital signal processor having at least one computation unit, wherein any of said amplifiers, said flash memory, said A/D converter, and said D/A converter is configured to be connected or integrated with said digital signal processor.

6. The noise cancellation device according to claim 5, wherein said linear power regulator, said switch power regulator, and said battery are configured to provide stable voltage, current supply, and power source for said noise cancellation device.

7. The noise cancellation device according to claim 5, wherein said digital processor further comprises:

- a filter bank analysis unit configured to decompose single-channel full-band speech signals into a number of multiple-channel narrow sub-band audio signals;
- a noise reduction unit configured to suppress noise and enhance speech quality based on said decomposed sub-band audio signals;
- a spectra equalization unit configured to equalize energy in low and high frequency bands of audio signals;
- a voice activity detection unit configured to detect locations of speech and silence signals in a given speech utterance; and
- a filter bank synthesis unit configured to combine said multi-channel narrow sub-band audio signals together into said single-channel full-band speech signals.

8. The noise cancellation device according to claim 7, wherein said noise reduction unit suppresses said noise and enhances said speech quality by applying at least one of a following set of algorithms comprising:

- a Wiener filter based noise reduction algorithm;
- a spectral subtraction noise reduction algorithm;
- a cochlear transform based noise reduction algorithm; and
- a model-based noise reduction algorithm.

9. The noise cancellation device according to claim 8, wherein applying said model-based noise reduction algorithm comprises:

- a model training session for training one of a Gaussian mixture model and a hidden Markov model to represent the statistical characteristics of noise sound;
- utilizing a sound model module that serves as a noise sound database;
- utilizing a noise identification module that identifies a noise sound by computing the likelihood scores of the sound with a group of pre-trained sound models; and
- utilizing a noise suppression system that removes said identified noise.

10. The noise cancellation device according to claim 9, wherein said noise suppression system comprises:

a filter bank analysis unit that decomposes wide-band signals into number of narrow sub-bands signals;

adaptive filters that remove and suppress noise on a sub-band basis; and filter bank synthesis unit that combines sub-band signals together and generates full-band speech signals.

11. The noise cancellation device according to claim 7, wherein said voice activity detection unit is implemented by a change-point detection algorithm.

12. The noise cancellation device according to claim 11, wherein an optimal filter the detects decrease and increase of signal energy and uses a set of thresholds to separate audio speech signals into a silence state, an in-speech state, and a leaving-speech state.

13. The noise cancellation device according to claim 7, wherein said voice activity detection unit is implemented by an energy-based algorithm.

14. The noise cancellation device according to claim 13, wherein an energy threshold is set to separate said audio speech signals into said in-speech state, said leaving-speech state and said silence state, and the said energy threshold set by a minimum value of sub-band noise power within a finite window, to estimate a noise floor.

15. The noise cancellation device according to claim 1, wherein said audio signal processing module is an analog signal processing module.

16. The noise cancellation device according to claim 15, wherein said analog signal processing module further comprises:

a pre-amplifier to amplify audio signals of said contact microphone;

a pre-amplifier to amplify audio signals of said in-the-ear microphone; and an analog signal processor, said analog signal processor comprising:

a set of band-pass filters that decompose said single-channel full-band speech signals into multiple-channel narrow sub-band audio signals;

a set of noise reduction filters for noise reduction and noise suppression;

a set of spectra equalization filters that equalize said energy in said low and said high frequency bands of said audio signals;

a voice activity detection module that detects the locations of said speech and said silence signals in said given speech utterance; and a set of band-pass filters that synthesize said multi-channel narrow sub-band audio signals into said single-channel full-band speech signals.

17. The noise cancellation device according to claim 16, wherein said voice activity detection module is implemented by said change-point detection algorithm.

18. The noise cancellation device according to claim 17, wherein an optimal filter detects decrease and increase of said signal energy and uses a set of thresholds to separate said audio speech signals into a silence state, an in-speech state, and a leaving-speech state.

19. The noise cancellation device according to claim 16, wherein said voice activity detection module is implemented by said energy-based algorithm.

20. The noise cancellation device according to claim 19, wherein an energy threshold is set to separate said audio speech signals into said in-speech state, said leaving-speech and said silence state, said energy threshold set by a minimum value of sub-band noise power within a finite window, to estimate a noise floor.

* * * * *